(12) United States Patent
Chalvet et al.

(10) Patent No.: US 9,168,653 B2
(45) Date of Patent: Oct. 27, 2015

(54) MICROROBOT, AND ASSOCIATED CONTROL METHOD, SIMULATION METHOD, AND COMPUTER PROGRAMS

(75) Inventors: Vincent Chalvet, Besancon (FR); Yassine Haddab, Besancon (FR); Philippe Lutz, Chatillon le Duc (FR); Artur Zarzycki, Besancon (FR)

(73) Assignees: CENTRE NATIONAL DE LA RECHERCHE SCIENTIFIQUE—CNRS, Paris (FR); UNIVERSITE DE BESANCON, Besancon (FR); ECOLE NATIONALE SUPERIEURE DE MECANIQUE ET DES MICROTECHNIQUES, Besancon (FR)

( * ) Notice: Subject to any disclaimer, the term of this patent is extended or adjusted under 35 U.S.C. 154(b) by 284 days.

(21) Appl. No.: 13/983,382

(22) PCT Filed: Jan. 31, 2012

(86) PCT No.: PCT/FR2012/050209
§ 371 (c)(1),
(2), (4) Date: Aug. 2, 2013

(87) PCT Pub. No.: WO2012/104546
PCT Pub. Date: Aug. 9, 2012

(65) Prior Publication Data
US 2013/0310975 A1 Nov. 21, 2013

(30) Foreign Application Priority Data
Feb. 3, 2011 (FR) ...................................... 11 50883

(51) Int. Cl.
*B25J 7/00* (2006.01)
*B25J 15/00* (2006.01)

(52) U.S. Cl.
CPC .. *B25J 7/00* (2013.01); *B25J 15/00* (2013.01); *Y10T 74/20305* (2015.01)

(58) Field of Classification Search
CPC ................................. B25J 7/00; B81B 3/0018
See application file for complete search history.

(56) References Cited

U.S. PATENT DOCUMENTS 7,012,491 B1  3/2006 Geisberger et al.

OTHER PUBLICATIONS

European Patent Office, International Search Report and Written Opinion issued in corresponding PCT application No. PCT/FR2011/050209, dated Apr. 12, 2012.

(Continued)

*Primary Examiner* — Khoi Tran
*Assistant Examiner* — Ryan Rink
(74) *Attorney, Agent, or Firm* — Patzik, Frank & Samotny Ltd.

(57) ABSTRACT

The invention relates to a microrobot that is microfabricated using microelectromechanical system technology, including i pairs of drive modules wherein i ranges from 1 to n, where n is no less than 1, the microrobot comprising: a mounting arranged so as to support at least two drive modules aligned in a first direction, said drive modules forming a pair of drive modules; i pairs of primary connecting-rod assemblies, each primary connecting-rod assembly being pivotably connected to the drive pin of a drive module of the $i^{th}$ pair of drive modules; a pair of secondary connecting-rod assemblies, each secondary connecting-rod assembly being pivotably connected to the primary connecting-rod assembly of the $n^{th}$ pair of drive modules and to the mounting; and an actuating member pivotably connected to each secondary connecting-rod assembly.

14 Claims, 5 Drawing Sheets

(56) References Cited

OTHER PUBLICATIONS

Greminger, M.A. et al., "A Four Degree of Freedom MEMS Microgripper with Novel Bi-Directional Thermal Actuators", 2005 IEEE/RSJ International Conference on Intelligent Robots and Systems, Edmonton, AB, Canada, Aug. 2-6, 2005, IEEE, Piscataway, New Jersey, pp. 1166-1171.

Qiao Chen, Yassine Haddab, Philippe Lutz, "Microfabricated Bistable Module for Digital Microbotics", Journal of Micro Nano Mechatronics, Jan. 21, 2011, entire document.

MICROROBOT, AND ASSOCIATED CONTROL METHOD, SIMULATION METHOD, AND COMPUTER PROGRAMS

FIELD OF THE INVENTION

The invention concerns a microrobot and associated control method, simulation method, and computer programs.

BACKGROUND OF THE INVENTION

In medical applications or in electron microscopy (TEM, SEM), relocating objects smaller than a millimeter in size must be done within a confined medium. To perform such relocations, microrobots made of smart materials have been designed. These microrobots allow moving an object for a distance proportional to the value or duration of a stimulus. The stimuli are, for example, formed by applying an electrical or magnetic field, applying a voltage, or varying the temperature.

The operation of these microrobots is often complex and non-linear, meaning that the movement of smart material is not linear with the applied stimulus. In addition, the operation of these microrobots is sometimes not stable, as environmental conditions such as temperature and humidity have an influence. The microrobots are generally controlled in a closed loop. Such closed-loop control requires the integration of small sensors and the use of costly and bulky signal processing tools. Encapsulation and integration of these sensors is also difficult.

To overcome these difficulties, bistable drive modules have been developed called "bistable modules." These bistable modules each include a drive pin able to move into two stable positions. To increase the workspace for such bistable modules to a number of positions greater than two, the bistable modules have been stacked atop one another.

Such stacking is not sturdy, however, and there is a high risk of it collapsing. In addition, stacking only allows moving objects along a line.

The aim of the present invention is to overcome these disadvantages and to propose a microrobot providing a workspace in two dimensions.

SUMMARY OF THE INVENTION

For this purpose, an object of the invention is a microrobot microfabricated according to microelectromechanical system technology, comprising i pair of drive modules where i ranges from 1 to n, n being greater than or equal to 1; each drive module comprising a drive pin able to be moved in a direction referred to as the second direction y; characterized by the microrobot comprising:
  a mounting arranged to support two drive modules aligned in a direction perpendicular to the second direction y, referred to as the first direction x, said drive modules forming a pair of drive modules;
  i pair of primary connecting-rod assemblies, each primary connecting-rod assembly being pivotably connected to the drive pin of a drive module of the $i^{th}$ pair of drive modules;
  a pair of secondary connecting-rod assemblies, each secondary connecting-rod assembly being pivotably connected to the primary connecting-rod assembly of the $n^{th}$ pair of drive modules and to the mounting; and
  an actuating member pivotably connected to each secondary connecting-rod assembly.

This microrobot is thus able to move in two directions, into at least four positions defining a quadrilateral.

Depending on the embodiments, the microrobot may comprise one or more of the following characteristics:
  the primary connecting-rod assemblies and the secondary connecting-rod assemblies each comprise a rod extending in the first direction x, referred to as the first rod, and a rod extending in the second direction y, referred to as the second rod, said second rod being pivotably connected to the first rod;
  the second rods of a secondary connecting-rod assembly are pivotably connected substantially to the middle of the first rods of a primary connecting-rod assembly, and when n is greater than or equal to 2, the second rods of a primary connecting-rod assembly pivotably connected to a drive module of an $i^{th}$ pair are pivotably connected substantially to the middle of the first rods of a primary connecting-rod assembly pivotably connected to a drive module of an i−1 pair;
  the first rods each have a dimension greater than 100 times the distance that a drive pin of a single drive module is able to travel;
  the actuating member comprises two actuating arms pivotably connected to each other, said actuating arms extending substantially at a 45° angle relative to the first rods of the secondary connecting-rod assemblies;
  the mounting comprises n dividing areas inserted in the first direction x between the drive modules of a same pair; and when n is greater than or equal to 2, for i ranging from 1 to n, the dimension of the i−1 dividing area inserted between the drive modules of the i−1 pair is greater in the first direction x than that of the dividing area inserted between the drive modules of the $i^{th}$ pair;
  the mounting comprises n pair of extensions, each able to support at least part of a drive module, said extensions extending along the first direction x but in opposite directions to one another;
  when n is greater than 2: the drive modules of the $i^{th}$ pair are each inserted between the drive modules of the i−1 pair and the drive modules of the i+1 pair; and the drive modules of the $i^{th}$ pair are aligned along the second direction y and each is offset in opposite directions along the first direction x relative to the drive modules of the i+1 pair;
  for i equal to 1, the primary connecting-rod assemblies pivotably connected to the $i^{th}$ pair of drive modules are pivotably connected to the extension supporting this $i^{th}$ pair of drive modules,
  for i ranging from 2 to n, the primary connecting-rod assemblies pivotably connected to the $i^{th}$ pair of drive modules are also each pivotably connected to the primary connecting-rod assembly pivotably connected to the i−1 pair of drive modules;
  each drive module comprises at least one actuator able to move the drive pin when said actuator is supplied with current, and said mounting carries electrical connections through which an electric current is able to flow in order to supply power to said actuators.

Another object of the invention is a method for controlling a movement of the actuating member of a microrobot as defined above, to a position defined by coordinates in a predefined coordinate system R'; said method comprising the following steps:
  for each coordinate among said abscissa and said ordinate, dividing said coordinate by the minimum deviation $\delta_x'$, $\delta_y'$ between two positions reachable by the actuating member;

calculating the closest integer to the result of said division;

converting said closest integer into binary;

for each bit equal to one in each binary number obtained, moving to a high position the actuating pin of a drive module defined by electrical connections formed on said mounting.

In addition, an object of the invention is a method for simulating the movement of an object by a microrobot as defined above, said method comprising the following steps:

entering as a binary number the positions of the actuating pins of each drive module of the microrobot;

calculating the ordinate and abscissa of the actuating member in a predefined coordinate system R', based on the length of the first rod, the width of the first rod, and the movements $\delta_1$, $\Delta_r$ of the drive modules.

In addition, an object of the invention is a computer program comprising instructions for carrying out the control method as defined above, when they are executed by a processor.

Lastly, an object of the invention is a computer program comprising instructions for carrying out the simulation method as defined above, when they are executed by a processor.

BRIEF DESCRIPTION OF THE DRAWINGS

The invention will be better understood by reading the following description, provided solely as an example and referring to the drawings, in which.

DETAILED DESCRIPTION OF THE INVENTION

Figure 1:
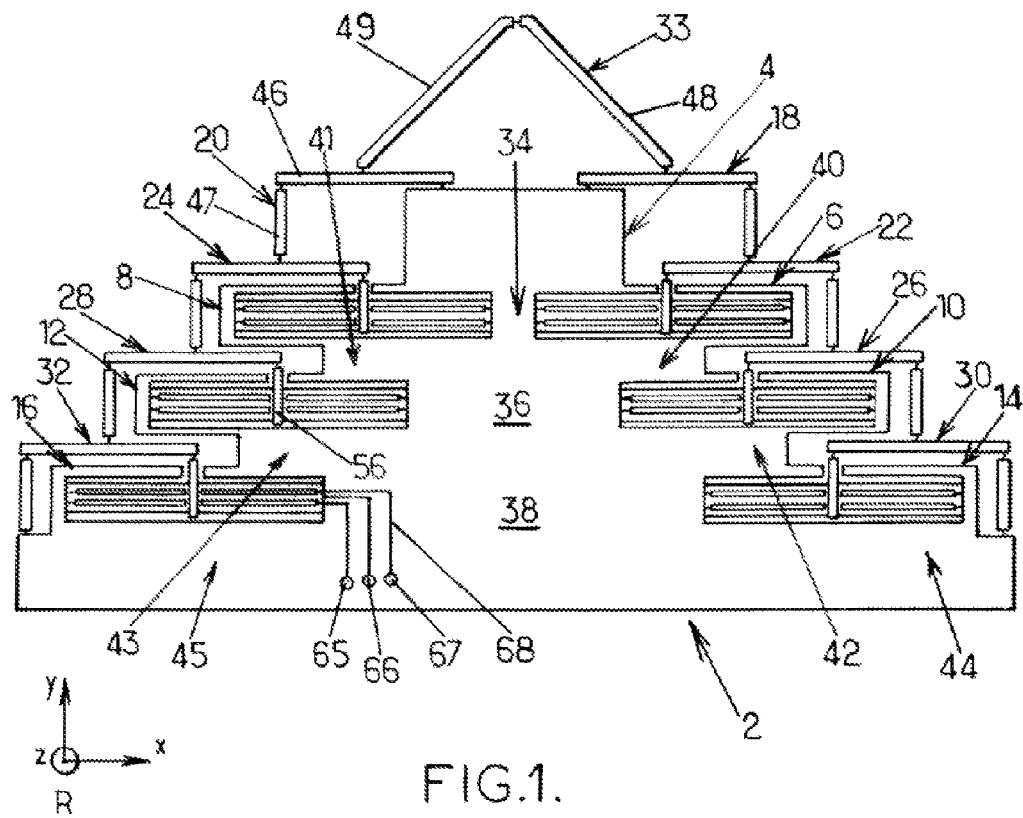
FIG. 1 is a schematic front view of a microrobot according to a first embodiment of the invention.
Figure 2:
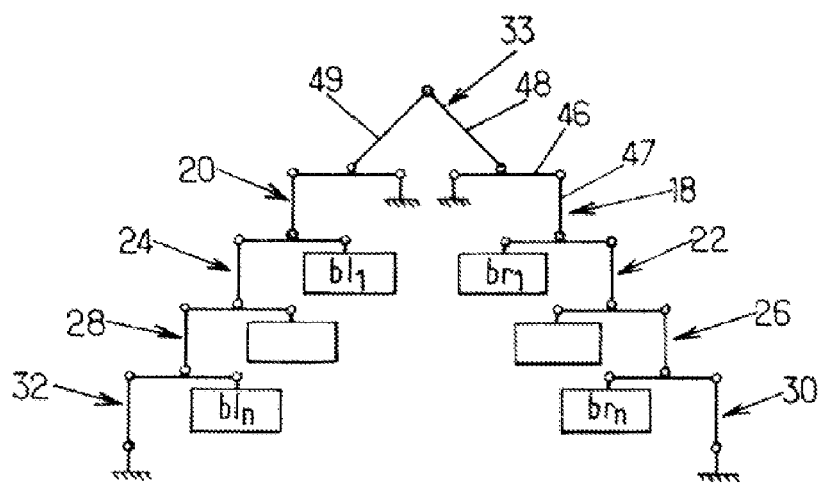
FIG. 2 is a block diagram of the microrobot illustrated in FIG. 1.

The present invention is defined relative to an orthogonal coordinate system R (x, y, z) represented in FIG. 1. The directions of vectors x, y and z are defined as being the positive direction. The reverse direction is defined as being a negative direction.

By convention, in the following description the direction x in the coordinate system R (x, y, z) is called the "first direction" and the direction y in this coordinate system is called the "second direction." In the following description, the terms "top", "bottom", "lower", "upper", "right", and "left" are defined for when the microrobot of the invention is placed as illustrated in FIG. 1, but are in no way limiting.

In the various figures, elements labeled with the same reference denote identical or similar elements.

The microrobot of the invention is microfabricated using microelectromechanical system technology, generally known as MEMS. It is, for example, created from silicon. It consists of a monolithic plate lying in plane (x, y), and the set of components described below are formed within it.

Referring to FIG. 1, the microrobot 2 comprises a mounting 4, six drive modules 6 to 16 carried by the mounting 4, eight connecting-rod assemblies 18 to 32 pivotably connected to the drive modules 6 to 16, and an actuating member 33 pivotably connected to two connecting-rod assemblies 18, 20.

The drive modules 6 to 16 are secured to the mounting 4. They are arranged in three pairs 6 and 8, 10 and 12, 14 and 16, aligned along the first direction x.

The three pairs of drive modules 6 and 8, 10 and 12, 14 and 16 are superimposed in the second direction y. In particular, the right drive module 6 of the third pair 6, 8 is aligned along the second direction y and is offset in the negative direction along the first direction x relative to the right drive module 10 of the second pair 10, 12; the second pair is aligned in direction y relative to the third pair 6, 8. The left drive module 8 of the third pair 6, 8 is aligned in the second direction y and is offset in the positive direction along the first direction x relative to the left drive module 12 of the second pair 10, 12. The drive modules of the first pair 14, 16 are also arranged in the same manner relative to the drive modules of the second pair 10, 12.

The mounting 4 is able to expand in the first direction x when heading in the negative direction along the second direction y. It has a generally triangular shape in which two opposite sides have a stair shape.

It contains three dividing areas 34, 36, 38 each inserted in the first direction x between the drive modules of a same pair. Thus dividing area 34 is between drive modules 6 and 8 of the third pair. Dividing area 36 is between drive modules 10 and 12 of the second pair. Lastly, dividing area 38 is between drive modules 14 and 16 of the first pair.

The dimension in first direction x of the dividing area 38 between drive modules 14 and 16 of the first pair is greater than that of the dividing area 36 between drive modules 10 and 12 of the second pair. Similarly, the dimension in first direction x of the dividing area 36 between drive modules 10 and 12 of the second pair is greater than that of the dividing area 34 between drive modules 6 and 8 of the third pair.

The right lower edge of each dividing area 34, 36, 38, continues in an extension 40, 42, 44 which runs in the positive direction along first direction x. The left lower edge of each dividing area 34, 36, 38, also continues in an extension 41, 43, 45 which runs in the negative direction along first direction x.

Each extension 40 to 45 is able to support part of a drive module. The extensions 40, 41; 42, 43 supporting the drive modules of the second and third pairs 10, 12; 6, 8 extend above part of the drive modules of the first and second pairs 14, 16; 10, 12. For example, the right extension 42 supporting the right drive module 10 of the second pair 10, 12 extends above part of the right drive module 14 of the first pair 14, 16. Similarly, the left extension 43 supporting the left drive module 12 of the second pair 10, 12 extends above part of the left drive module 16 of the first pair 14, 16. Thus the extensions 40 to 45 support and give rigidity to the drive modules 6 to 16 while allowing the microrobot 2 its mobility.

The connecting-rod assemblies 18 to 32 include connecting-rod assemblies 22 to 32 pivotably connected to a drive pin 56 of a drive module, referred to below as primary connecting-rod assemblies, and connecting-rod assemblies 18, 20 pivotably connected to the actuating member 33, referred to below as secondary connecting-rod assemblies.

In the rest of the description, the first 30, 32, second 26, 28 and third 22, 24 pairs of primary connecting-rod assemblies refer to the primary connecting-rod assemblies pivotably connected to the drive pins of the drive modules of the first pair 14, 16, of the second pair 10, 12; and of the third pair 6, 8 respectively.

The primary connecting-rod assemblies of a given pair are also each pivotably connected to the primary connecting-rod assembly of the pair aligned in direction y and offset in direction x relative to this given pair. For example, the primary connecting-rod assemblies of the third pair 22, 24 are also pivotably connected to the primary connecting-rod assemblies of the second pair 26, 28. In the same manner, the primary connecting-rod assemblies of the second pair 26, 28 are also pivotably connected to the primary connecting-rod assemblies of the first pair 30, 32.

The primary connecting-rod assemblies of the first pair 30, 32 are pivotably connected to the extension 44, 45 supporting the drive modules 14, 16 of the second pair.

The connecting-rod assemblies 18 to 32 each consist of two bars having a narrowed area at each of their ends, forming flexible circular joints which act as the rotation connection. In the following description, these pivotably connected bars are referred to as "rods." The primary and secondary connecting-rod assemblies 18 to 32 each contain a rod 46 extending in the first direction x, hereinafter called the first rod 46, and a rod extending in the second direction y, hereinafter called the second rod 47.

The first rods 46 preferably have a dimension more than one hundred times greater than the distance the drive pin 56 of a drive module can travel. Preferably, the first rods have a length slightly greater than the width of a drive module, i.e. greater than a few millimeters; the second rods have a length slightly greater than the height of a drive module, i.e. greater than a few millimeters.

In the embodiment of the invention illustrated in FIG. 1, the second rods 47 of a given pair of primary connecting-rod assemblies as well as the second rods of a secondary pair of connecting-rod assemblies are pivotably connected substantially to the middle of the first rods 46 of the pair of primary connecting-rod assemblies aligned along the second direction y relative to the given pair. Thus, the second rods 47 of the secondary connecting-rod assemblies 18, 20 are pivotably connected substantially to the middle of the first rods 46 of the primary connecting-rod assemblies of the third pair 22, 24. Similarly, the second rods 47 of the primary connecting-rod assemblies of the third pair 22, 24 are pivotably connected substantially to the middle of the first rods 46 of the primary connecting-rod assemblies of the second pair 26, 28.

The actuating member 33 is able to push or carry micro or nano objects. It comprises two actuating arms 48, 49 pivotably connected to each other. Each actuating arm 48 forms a 90° angle relative to the other actuating arm 49.

The actuating arms 48, 49 are each pivotably connected substantially to the middle of the first rod 46 of the secondary connecting-rod assemblies 18, 20. Each actuating arm 48, 49 extends substantially at a 45° angle relative to the first rods 46 of the secondary connecting-rod assemblies 18, 20. This configuration allows generating a workspace having four right angles.

Figure 3:
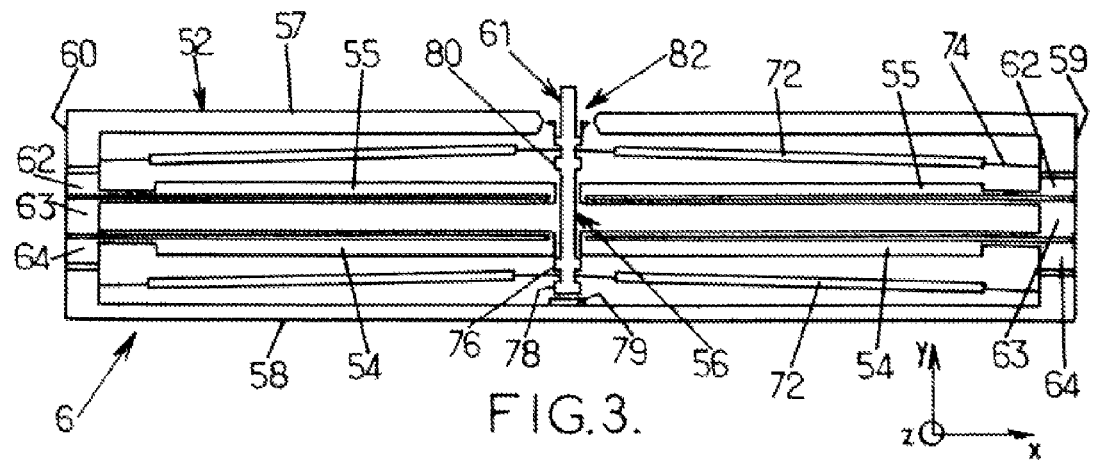
FIG. 3 is a front view of a drive module of the microrobot illustrated in FIG. 1.

The drive modules 6 to 16 are identical. Only drive module 6 is described in detail. Referring to FIG. 3, each drive module 6 comprises a parallelepipedic rectangular frame 52, two lower actuators 54 and two upper actuators 55 supported by the frame 52, and a drive pin 56 able to be moved in the positive direction along the second direction y, by the upper actuators 55, and in the negative direction along this same direction, by the lower actuators 54.

The frame comprises two crosspieces 57, 58 attached to two end risers 59, 60. The upper crosspiece 57 is equipped with an opening 61 traversed by the drive pin 56. A lower actuator 54 and an upper actuator 55 are attached to the inside face of the right end riser 59. A lower actuator 54 and an upper actuator 55 are attached to the lower face of the left end riser 60.

Three electrical contacts 62, 63, 64 are formed in the face lying in plane (x, y) of each end riser 59, 60 of the frame 52. The electrical contacts 62, 63, 64 are electrically connected to electrical terminals 65, 66, 67, by electrical connections 68 in order to supply current to the lower actuators 54 and upper actuators 55, as can be seen in FIG. 1. The central electrical contact 63 is electrically connected to the ground. The electrical connections 68 are obtained by depositing a layer of aluminum atoms, then diffusing the atoms into the silicon by annealing in an oven at 400° C. for about an hour. In FIG. 1, for simplicity only three electrical connections 68 for powering a lower actuator 54 and an upper actuator 55 are represented. In actuality, the mounting 4 carries electrical connections and electrical terminals which supply power to all actuators of the microrobot.

The actuators are identical to each other. They are arranged symmetrically within the frame 52. In particular, the left lower actuator 54 is arranged symmetrically to the left upper actuator 55 relative to plane (x, z). The right lower actuator 54 is arranged symmetrically to the left lower actuator 54 relative to plane (y, z).

Figure 4:
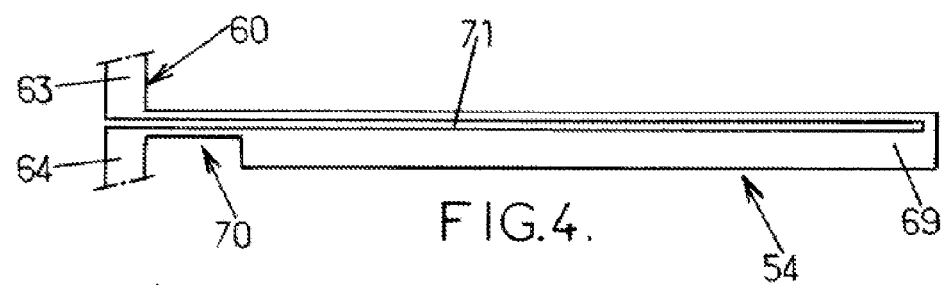
FIG. 4 is a front view of an actuator of the drive module illustrated in FIG. 3.

Only the left lower actuator 54 is described in detail with reference to FIG. 4. It is formed by a strip 69 which extends in the first direction x. The lower edge of the strip 69 has a rectangular cutout 70 near the left end riser 60. The strip 69 additionally has a longitudinal slit 71 extending to the outside through the left end riser 60, on each side of the electrical contacts 63, 64 supplying power to the left lower actuator 54. As the strip 69 is fabricated of a smart material, it bows when current applied between electrical contacts 63 and 64 travels through it.

The drive module 6 additionally comprises four bars 72 extending substantially in the first direction x. Two bars 72 arranged on the right are attached by tabs 74 to the right end riser 59 and to the drive pin 56. One of these bars 72 is attached between the upper crosspiece 57 and upper actuator 55 and the other between the lower crosspiece 58 and lower actuator 54. The two bars 72 arranged on the left have the same arrangement as the two bars 72 arranged on the right aside from the fact that they are attached to the left end riser 60.

The lower and upper bars 72 maintain the drive pin 56 in the low position or high position, when current is no longer being applied between the electrical contacts 63 and 64.

The drive pin 56 extends in the second direction y. It comprises a lower drive block 76 and an upper drive block 80, each extending along the first direction x on each side of the body of the drive pin 56.

The lower faces of the free ends of the lower actuators 54 are each able to push against an upper face of the lower drive block 76 in order to move the drive pin 56 in the negative direction along the second direction when current is applied between the electrical contacts 63 and 64, to place the drive pin 56 in the low position.

Similarly, the upper faces of the free ends of the upper actuators 55 are each able to push against a lower face of the upper drive block 80 in order to move the drive pin 56 in the positive direction along the second direction when current is applied between the electrical contacts 62 and 63, to place the drive pin 56 in the high position.

The drive pin 56 additionally comprises a lower stop block 78 and an upper stop element 82 to guarantee extreme accuracy in positioning the drive pin 56, when the pin is respectively in its low and high position.

When the drive pin 56 is placed in the low position, the lower stop block 78 comes into contact with a support 79 formed in the center of the lower face of the lower crosspiece 58.

Figure 5:
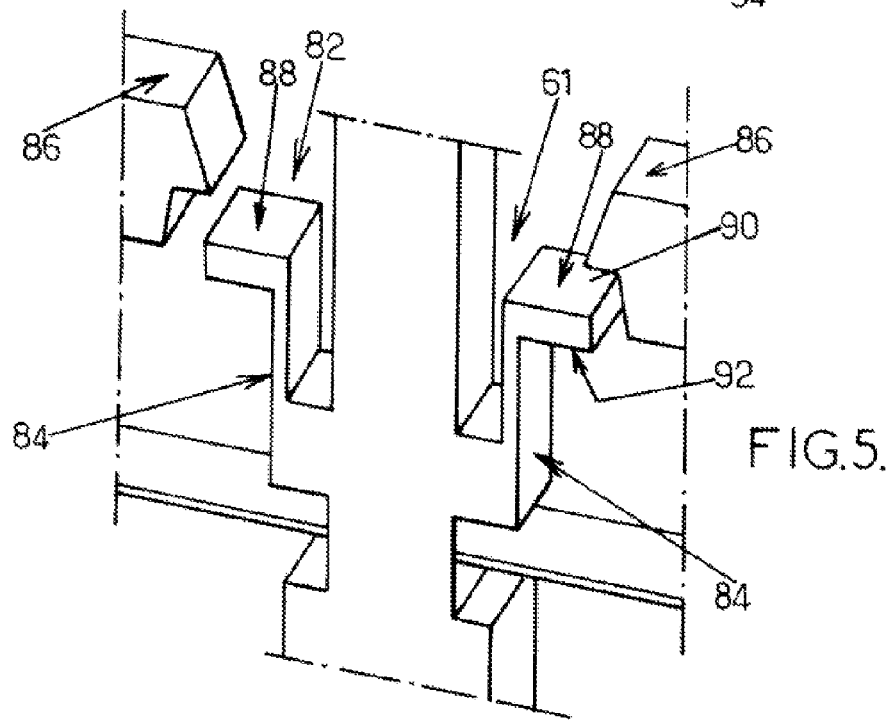
FIG. 5 is a perspective view of an upper stop element of the drive module illustrated in FIG. 3.

The upper stop member 82, illustrated in FIG. 5, comprises two elastic tabs 84, each able to cooperate with a tooth 86 shaped in an edge of the opening 61 of the frame 52. The elastic tabs 84 have the general shape of an inverted L. The arms 88 of each elastic tab 84 extend along the first direction x but in opposite directions. When the drive pin 56 is in a high position, part of the upper face 90 of each arm 88 presses against a supporting face 92 lying in plane (x, z) of the tooth 86.

With this form and structure of the microrobot 2, the actuating modules 14, 16 of the first pair are able to move the actuating member 33 by a distance equal to one basic movement $\delta_{x'}$ or $\delta_{y'}$. The actuating modules 10, 12 of the second pair are able to move the actuating member 33 by a distance equal to two basic movements, $2\delta_{x'}$ or $2\delta_{y'}$. Lastly, the actuating modules 6, 8 of the third pair are able to move the actuating member 33 by a distance equal to four basic movements, meaning $4\delta_{x'}$ or $4\delta_{y'}$.

The operation of the drive modules 6 to 16 is described in detail in the document entitled "*Microfabricated bistable module for digital microrobotics*" by Qiao Chen, Yassine Haddab and Philippe Lutz, published by Springer on Sep. 14, 2010, and the document "*Characterization and control of a monolithically fabricated bistable module for microrobotic applications*" by Qiao Chen, Yassine Haddab and Philippe Lutz, published in "*IEEE/RSJ International Conference on Intelligent Robots and Systems, IROS'10, Taipei: Taiwan, Province of China* (2010)."

Figure 6:
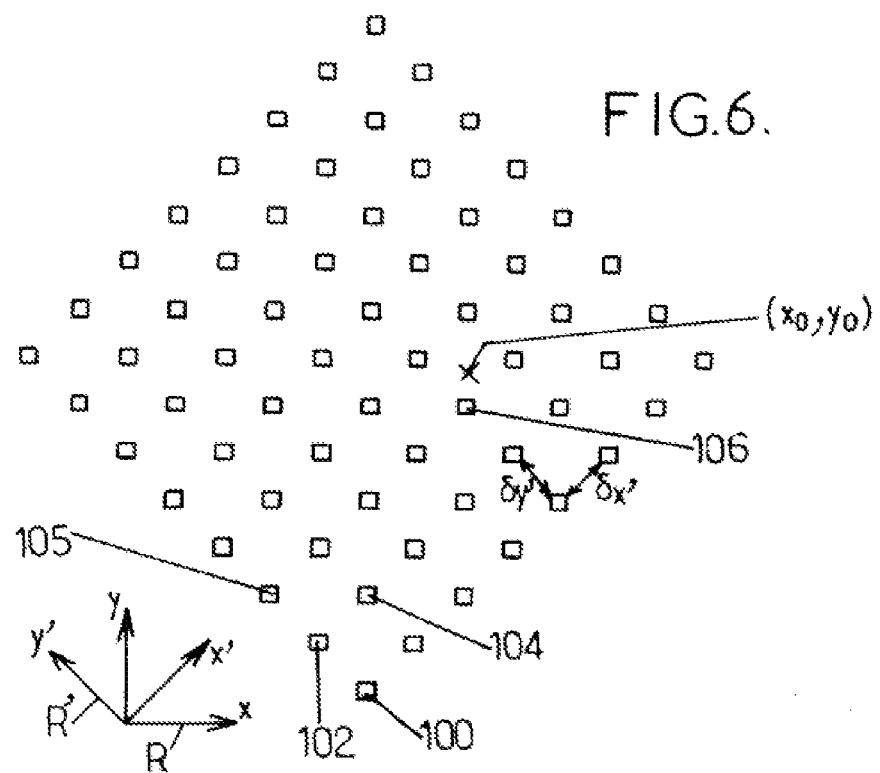
FIG. 6 is a diagram representing the workspace generated by the microrobot illustrated in FIG. 1.

The workspace generated by the microrobot 2 illustrated in FIG. 1 has been represented in FIG. 6.

In this FIG. 6, each square represents a position which can be reached by the microrobot 2. In particular, square 100 represents the position of the end of actuating member 33 when no drive module 6 to 16 is active, meaning when the drive pins 56 of all the drive modules are in the low position. Square 102 represents the position of the end of the actuating member 33 when drive module 14 has been activated, meaning when the drive pin 56 of drive module 14 is positioned in the low position. Similarly, square 104 represents the position of the end of the actuating member 33 when drive modules 14 and 16 of the first pair have been activated, meaning when the drive pins 56 of drive modules 14 and 16 are in the high position. Square 105 represents the position of the end of the actuating member 33 when drive module 10 of the second pair has been activated.

The microrobot 2 in this first embodiment of the invention has a resolution of 500 nanometers. Each drive module generates a movement of 10 micrometers between two positions. This microrobot 2 occupies a workspace of approximately 4 cm by 4 cm for a thickness of 500 micrometers. It generates a discrete square workspace of 4 micrometers a side containing 64 distinct stable and robust positions.

Figure 7:
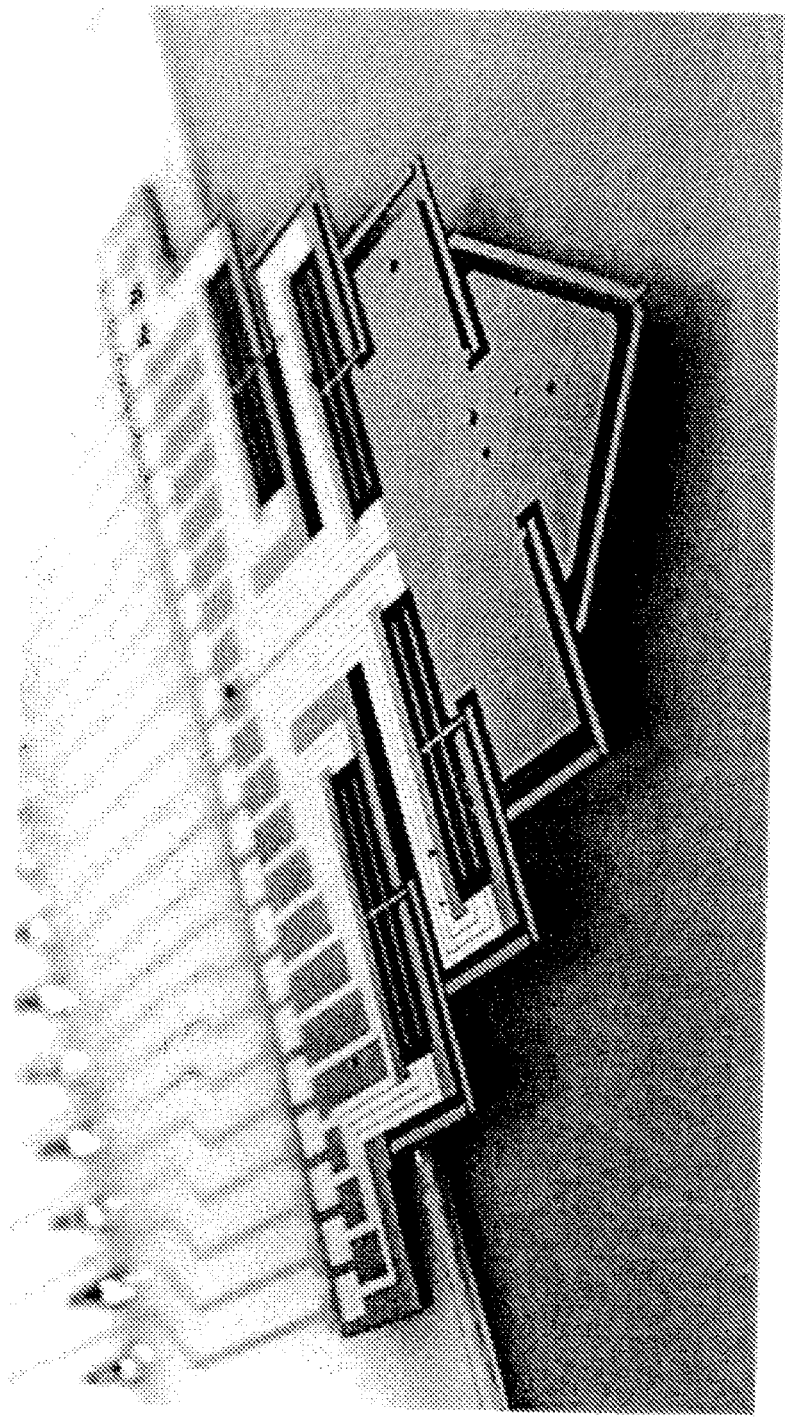
FIG. 7 is a photo representing a microrobot according to a second embodiment of the invention.

In a second embodiment of the invention, photographed in FIG. 7, the microrobot 2 comprises two pairs of drive modules.

As a variant, the microrobot of the invention may comprise only one pair of drive modules.

Figure 8:
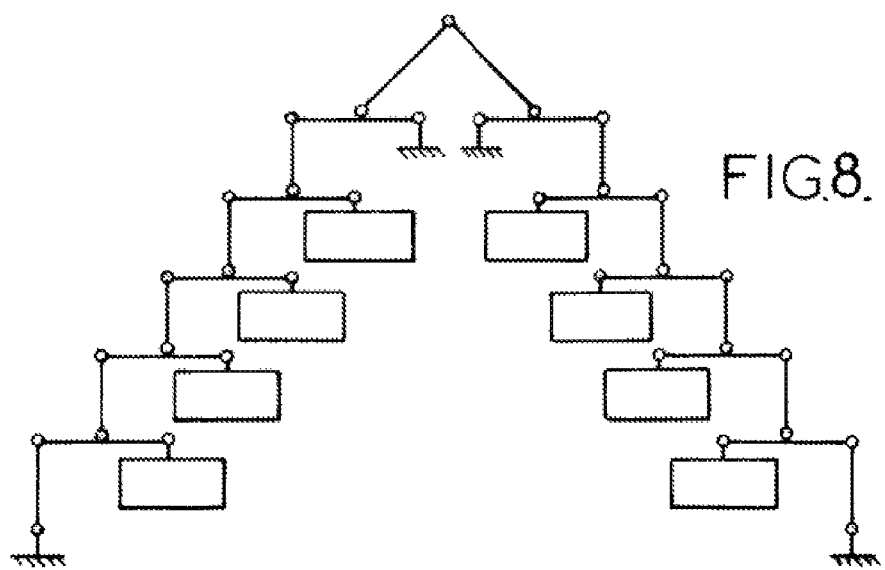
FIG. 8 is a block diagram of a microrobot according to a third embodiment of the invention.
Figure 9:
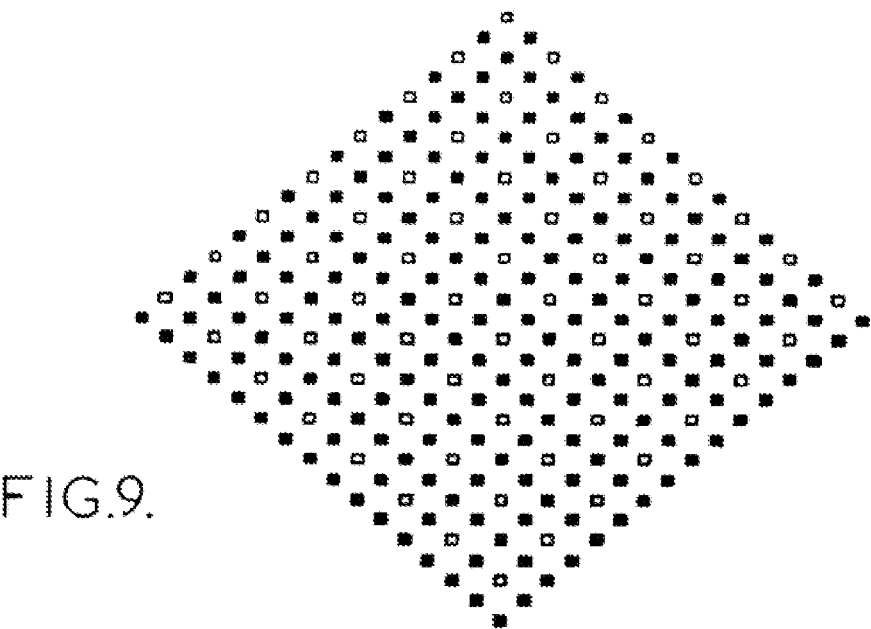
FIG. 9 is a diagram representing the workspace generated by the microrobot illustrated in FIG. 8.
Figure 10:
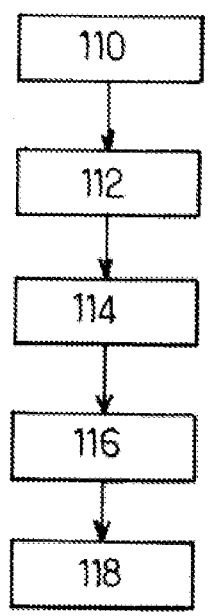
FIG. 10 is a diagram representing the steps of the control method of the invention.
Figure 11:
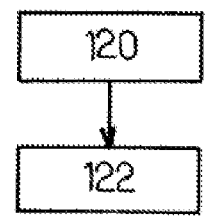
FIG. 11 is a diagram representing the steps of the simulation method of the invention.

In a third embodiment of the invention illustrated in FIG. 8, the microrobot 2 comprises four pairs of drive modules. In this case, the microrobot 2 is able to generate a workspace as illustrated in FIG. 9. This workspace has the same dimensions as the workspace generated by the microrobot illustrated in FIG. 1 but with double the resolution, meaning that, in this workspace, the microrobot can reach four times the number of positions reached by the microrobot having three pairs of drive modules. These positions are spaced apart from each other by a distance half the size of the distance separating two positions reached by the microrobot having three pairs of drive modules.

The invention also concerns a method for controlling a movement of the actuating member 33 of the microrobot according to the first, second, and third embodiments of the invention. This method is implemented by a computer program comprising instructions for carrying out this control method when they are executed by a processor.

The control method described is only described for the first embodiment of the invention, referring to FIGS. 1, 2, 6 and 10. It begins with a step 110 during which the operator enters the coordinates $(x_0, y_0)$ of the position where he wants to move the actuating member 33.

These coordinates $(x_0, y_0)$ are entered in the orthogonal coordinate system R' (x', y') illustrated in FIG. 6. The coordinate system R (x, y) has the same orientations as the coordinate system R (x, y, z) illustrated in FIG. 1. The direction vectors of coordinate system R' (x', y') form a 45° angle relative to the direction vectors of coordinate system R (x, y). The direction vectors of coordinate system R' (x', y') therefore form a 45° angle relative to the first direction x and to the second direction y.

As a variant, these coordinates are entered in coordinate system R (x, y), then are converted into coordinates in coordinate system R' (x', y').

During a step 112, the abscissa $x_0$ is divided by the minimum deviation $\delta_{x'}$ between two positions reachable by the microrobot 2 along the axis x', and the ordinate $y_0$ is divided by the minimum deviation $\delta_{y'}$ between two positions reachable by the microrobot 2 along the axis y'.

During a step 114, the closest integer to the division of $x_0/\delta_{x'}$ is calculated, and the closest integer to the division of $y_0/\delta_{y'}$ is calculated. Steps 112 and 114 allow determining what position is reachable by the microrobot 2 that is closest to the position requested by the operator. For example, position 106 defined by the coordinates (4, 2) is calculated.

During a step 116, the coordinates (4, 2) of the position 106 calculated during step 114 are converted into binary. For example, the abscissa 4 becomes 100 and the ordinate 2 becomes 10.

During a step 118, current is applied to the electrical terminals 65, 66, 67 connected to the drive modules defined by the electrical connections 68, so that the end of the actuating member 33 reaches position $(x_0, y_0)$. For example, drive modules 8 and 10 must be actuated in order to reach position $(x_0, y_0)$.

The steps of the control method can be expressed by the following mathematical equation $$\begin{cases} bl_i = \neg \left( \left( \text{round}\left(\frac{x'_0}{\delta x'}\right) \& 2^{N1-i} \right) == 0 \right) \\ br_j = \neg \left( \left( \text{round}\left(\frac{y'_0}{\delta y'}\right) \& 2^{N2-j} \right) == 0 \right) \end{cases}$$

where:
$bl_i$ is a boolean number representing the state of drive module i;
$br_j$ is a boolean number representing the state of drive module j;
i ranges from 1 to N1, N1 being the number of left drive modules;
j ranges from 1 to N2, N2 being the number of right drive modules;
"round" is the rounding function;
"$\neg$" is the NOT logic function;
& is the bitwise AND logic function;
$x'_0$ and $y'_0$ are the coordinates the operator wants to reach;
$\delta_{x'}$ and $\delta_{y'}$ are are the resolutions of the microrobot in directions x' and y';
== is the equality test operator.

Note that unlike the description of the microrobot structure, the numbering for i and j, for the drive modules in the mathematical formulas above and below, runs from top to bottom with respect to the figures.

The invention also concerns a method for simulating the movement of an object by the microrobot 2 according to the first, second, and third embodiments of the invention.

This simulation method begins with a step of entering 120 in binary notation the top or bottom positions of the actuating pin of each drive module of the microrobot.

Then, during a step 122, the abscissa $x_0$ and the ordinate $y_0$ of the actuating member 33 are calculated in coordinate system R (x, y) based on the length $L_1$ of the first rod 46, the width $L_2$ of the first rod 46, and the movements generated by the drive modules.

In particular, the ordinate and abscissa of the actuating member are calculated using the following formula:

$$\begin{bmatrix} x \\ y \end{bmatrix} = \frac{1}{4}\left(\frac{1}{2} + \frac{L_2}{L_1}\right) \cdot \begin{bmatrix} \delta l_1 & \cdots & \frac{\delta l_{N1}}{2^{N1-1}} & -\delta r_1 & \cdots & \frac{\delta r_{N2}}{2^{N2-1}} \\ \delta l_1 & \cdots & \frac{\delta l_{N1}}{2^{N1-1}} & \delta r_1 & \cdots & \frac{\delta r_{N2}}{2^{N2-1}} \end{bmatrix} \cdot \begin{bmatrix} bl_1 \\ \vdots \\ bl_{N1} \\ br_1 \\ \vdots \\ br_{N2} \end{bmatrix}$$

where:
$x_0$, $y_0$ are the abscissa and ordinate of the actuating member 33;
$bl_i$ is a boolean number representing the state of drive module i;
$br_j$ is a boolean number representing the state of drive module j;
i ranges from 1 to N1, N1 being the number of left drive modules;
j ranges from 1 to N2, N2 being the number of right drive modules;
$L_2$ is the width of the first rod 46;
$L_1$ is the length of the first rod 46;
$\delta_{l1}$ to $\delta_{lN1}$ are the movements generated by the left drive modules;
$\delta_{r1}$ to $\delta_{rN2}$ are the movements generated by the right drive modules.

As a variant, when the microrobot 2 comprises only one pair of drive modules 6, 8, the primary connecting-rod assemblies 22, 24 pivotably connected to the drive modules 6, 8 are pivotably connected to an extension supporting these drive modules 6, 8.

As a variant, the microrobot 2 comprises a different number of drive modules arranged on the right side than drive modules arranged on the left side of the mounting 4. In this case, the workspace is not symmetrical and the positions reachable by the microrobot are not equidistant.

As a variant, the drive pins of the drive modules arranged on the right of the mounting 4 are able to move over a distance that is different from the distance the drive pins of the left drive modules are able to move. In this case, the positions reached by the actuating member are not equidistant from each other.

As a variant, each extension 40 to 45 is able to support an entire drive module.

As a variant, the microrobot is made of a piezoelectric, electrostatic, or shape-memory material.

As a variant, the actuating arms 48 and 49 are pivotably connected to any point of the first rods 46 of the secondary connecting-rod assemblies, meaning they are not necessarily pivotably connected to the middle of the rods 46.

Advantageously, no external energy is necessary to maintain these bistable modules in their stable positions. These bistable modules offer great repeatability.

Advantageously, this microrobot 2 is used in an open loop.

Advantageously, this microrobot has a high resolution.

Advantageously, the stop positions of the end of the actuating member 33 are equidistant from each other.

Advantageously, the workspace has four right angles.

Advantageously, the workspace is a workspace with two discrete dimensions.

The invention claimed is:

1. A microrobot microfabricated according to microelectromechanical system technology, comprising i pair of drive modules where i ranges from 1 to n, n being greater than or equal to 1; each drive module comprising a drive pin able to be moved in a second direction;
characterized by the microrobot comprising:
a mounting arranged to support two drive modules aligned in a first direction perpendicular to the second direction, said drive modules forming a pair of drive modules;
i pair of primary connecting-rod assemblies, each primary connecting-rod assembly being pivotably connected to the drive pin of a drive module of the $i^{th}$ pair of drive modules;
a pair of secondary connecting-rod assemblies, each secondary connecting-rod assembly being pivotably connected to the primary connecting-rod assembly of the $n^{th}$ pair of drive modules and to the mounting; and
an actuating member pivotably connected to each secondary connecting-rod assembly.

2. The microrobot according to claim 1, wherein the primary connecting-rod assemblies and the secondary connecting-rod assemblies each comprise a first rod extending in the first direction, and a second rod extending in the second direction, said second rod being pivotably connected to the first rod.

3. The microrobot according to claim 2, wherein the second rods of a secondary connecting-rod assembly are pivotably connected substantially to the middle of the first rods of a primary connecting-rod assembly, and when n is greater than or equal to 2, the second rods of a primary connecting-rod assembly pivotably connected to a drive module of an $i^{th}$ pair are pivotably connected substantially to the middle of the first rods of a primary connecting-rod assembly pivotably connected to a drive module of an i–1 pair.

4. The microrobot according to claim 2, wherein the first rods each have a dimension greater than 100 times the distance that a drive pin of a single drive module is able to travel.

5. The microrobot according to claim 2, wherein the actuating member comprises two actuating arms pivotably connected to each other, said actuating arms extending substantially at a 45° angle relative to the first rods of the secondary connecting-rod assemblies.

6. The microrobot according to claim 1, wherein the mounting comprises n dividing areas inserted in the first direction between the drive modules of a same pair, and when n is greater than or equal to 2, for i ranging from 1 to n, a dimension of the i–1 dividing area inserted between the drive modules of the i–1 pair is greater in the first direction than that of the dividing area inserted between the drive modules of the $i^{th}$ pair.

7. The microrobot according to claim 1, wherein the mounting comprises n pair of extensions each able to support at least part of a drive module, said extensions extending along the first direction but in opposite directions to one another.

8. The microrobot according to claim 1, wherein, when n is greater than 2: the drive modules of the $i^{th}$ pair are each inserted between the drive modules of the i–1 pair and the drive modules of the i+1 pair; and wherein the drive modules of the $i^{th}$ pair are aligned along the second direction and each is offset in opposite directions along the first direction relative to the drive modules of the i+1 pair.

9. The microrobot according to claim 7, wherein:
for i equal to 1, the primary connecting-rod assemblies pivotably connected to the $i^{th}$ pair of drive modules are pivotably connected to the extension supporting this $i^{th}$ pair of drive modules; and
for i ranging from 2 to n, the primary connecting-rod assemblies pivotably connected to the $i^{th}$ pair of drive modules, are also each pivotably connected to the primary connecting-rod assembly pivotably connected to the i–1 pair of drive modules.

10. The microrobot according to claim 1, wherein each drive module comprises at least one actuator able to move the drive pin when said actuator is supplied with current, and wherein said mounting carries electrical connections through which an electric current is able to flow in order to supply power to said actuators.

11. A method for controlling a movement of the actuating member of a microrobot towards a position defined by coordinates in a predefined coordinate system; said control method being carried out by a processor able to control the microrobot; the microrobot being microfabricated according to microelectromechanical system technology, the microrobot comprising i pair of drive modules, i ranging from 1 to n where n is greater than or equal to 1; each drive module comprising a drive pin able to be moved in a second direction; said microrobot comprising:

a mounting arranged to support two drive modules aligned in a direction perpendicular to the second direction, said drive modules forming a pair of drive modules;
i pair of primary connecting-rod assemblies, each primary connecting-rod assembly being pivotably connected to the drive pin of a drive module of the $i^{th}$ pair of drive modules;
a pair of secondary connecting-rod assemblies, each secondary connecting-rod assembly being pivotably connected to the primary connecting-rod assembly of the $n^{th}$ pair of drive modules and to the mounting; and
an actuating member pivotably connected to each secondary connecting-rod assembly;
said method comprising the following steps:
for each coordinate among said abscissa and said ordinate, dividing said coordinate by the minimum deviation between two positions reachable by the actuating member;
calculating the closest integer to the result of said division;
converting said closest integer into binary;
for each bit equal to one in each binary number obtained, moving to a high position the actuating pin of a drive module defined by electrical connections formed on said mounting.

12. A method for simulating the movement of an object by a microrobot, said simulation method being carried out by a processor able to control said microrobot; the microrobot being microfabricated according to microelectromechanical system technology, the microrobot comprising i pair of drive modules, i ranging from 1 to n where n is greater than or equal to 1; each drive module comprising a drive pin able to be moved in a second direction; said microrobot comprising:
a mounting arranged to support two drive modules aligned in a first direction perpendicular to the second direction, said drive modules forming a pair of drive modules;
i pair of primary connecting-rod assemblies, each primary connecting-rod assembly being pivotably connected to the drive pin of a drive module of the $i^{th}$ pair of drive modules;
a pair of secondary connecting-rod assemblies, each secondary connecting-rod assembly being pivotably connected to the primary connecting-rod assembly of the $n^{th}$ pair of drive modules and to the mounting; and
an actuating member pivotably connected to each secondary connecting-rod assembly;
said method comprising the following steps:
entering as a binary number the positions of the actuating pins of each drive module of the microrobot;
calculating the ordinate and abscissa of the actuating member in a predefined coordinate system, based on the length of the first rod, the width of the first rod, and the movements of the drive modules.

13. A computer program, characterized by its comprising instructions for implementing the method according to claim 11 when they are executed by said processor.

14. A computer program, characterized by its comprising instructions for implementing the method according to claim 12 when they are executed by said processor.

* * * * *